US010159998B2

(12) United States Patent
Skillin et al.

(10) Patent No.: US 10,159,998 B2
(45) Date of Patent: Dec. 25, 2018

(54) MEASURED DOSE DISPENSERS AND METHODS OF USING THE SAME

(71) Applicant: Silgan Dispensing Systems Slatersville LLC, Slatersville, RI (US)

(72) Inventors: Clifford W. Skillin, Blackstone, MA (US); Patrick J. Brannon, Warwick, RI (US)

(73) Assignee: SILGAN DISPENSING SYSTEMS SLATERSVILLE, LLC, Slatersville, RI (US)

( * ) Notice: Subject to any disclaimer, the term of this patent is extended or adjusted under 35 U.S.C. 154(b) by 0 days.

(21) Appl. No.: 15/739,912

(22) PCT Filed: Jun. 28, 2016

(86) PCT No.: PCT/US2016/039760
§ 371 (c)(1),
(2) Date: Dec. 26, 2017

(87) PCT Pub. No.: WO2017/004011
PCT Pub. Date: Jan. 5, 2017

(65) Prior Publication Data
US 2018/0185865 A1    Jul. 5, 2018

Related U.S. Application Data

(63) Continuation-in-part of application No. PCT/US2016/032388, filed on May 13, 2016, which
(Continued)

(51) Int. Cl.
B05B 11/04    (2006.01)
B05B 11/00    (2006.01)
(Continued)

(52) U.S. Cl.
CPC ........ B05B 11/047 (2013.01); B05B 11/0064 (2013.01); B05B 11/0072 (2013.01);
(Continued)

(58) Field of Classification Search
CPC .............. B08B 11/047; B08B 11/0072; B08B 11/0064; B08B 11/3097; B08B 11/3073;
(Continued)

(56) References Cited

U.S. PATENT DOCUMENTS 3,091,374 A    5/1963    Schwartzman
4,811,871 A    3/1989    Wass
(Continued)

FOREIGN PATENT DOCUMENTS

WO    2005049477 A2    6/2005
WO    2012171708 A1    12/2012
(Continued)

*Primary Examiner* — Lien Ngo
(74) *Attorney, Agent, or Firm* — Barlow, Josephs & Holmes, Ltd.

(57) ABSTRACT

A dispensing closure (10) for dispensing a flowable product (12) from a squeeze-type product container (14) includes a closure body (16) having an upper deck (32), an exit orifice (34), a flow conduit (36) providing a flow path to the exit orifice, and a skirt (40) configured to attach to the product container. A measuring reservoir (26) is received in engagement with a lower surface of the upper deck. The measuring reservoir is filled with a measured dose of flowable product through flow ports (54) when the container is inverted. A piston valve (28) is slidably movable within the measuring reservoir between an open position and a closed position. The piston valve is movable from the open position to the closed position to dispense the measured dose of product responsive to pressure within the container induced by squeezing.

17 Claims, 15 Drawing Sheets

Related U.S. Application Data is a continuation-in-part of application No. 14/754,252, filed on Jun. 29, 2015, now Pat. No. 9,555,426.

(51) Int. Cl.
  *B65D 47/20* (2006.01)
  *B65D 47/08* (2006.01)
(52) U.S. Cl.
  CPC ...... *B05B 11/3022* (2013.01); *B05B 11/3073* (2013.01); *B05B 11/3097* (2013.01); *B65D 47/0838* (2013.01); *B65D 47/2068* (2013.01)
(58) Field of Classification Search
  CPC ............ B08B 11/3022; B67D 47/0838; B67D 47/2068
  USPC .......... 222/207, 212–215, 491–497, 477, 92, 222/106, 107
  See application file for complete search history.

(56) References Cited

U.S. PATENT DOCUMENTS

| | | | |
|---|---|---|---|
| 4,946,080 A | 8/1990 | Vesborg | |
| 5,253,788 A * | 10/1993 | Vandromme | ........... B05B 11/04 222/321.6 |
| 5,341,718 A | 8/1994 | Woodall, Jr. et al. | |
| 6,341,718 B1 | 1/2002 | Schilthuizen et al. | |
| 6,357,627 B1 * | 3/2002 | Pasbrig | ................ B65D 51/226 222/425 |
| 8,366,681 B2 | 2/2013 | Carpenter | |
| 8,851,333 B2 | 10/2014 | van de Poll | |
| 9,555,426 B2 * | 1/2017 | Skillin | .................. B05B 11/047 |
| 9,625,299 B2 * | 4/2017 | Holden | ................ G01F 11/268 |
| 2010/0006601 A1 | 1/2010 | De Man et al. | |
| 2010/0072229 A1 * | 3/2010 | Veltrop | ................ A47G 19/183 222/207 |
| 2011/0089191 A1 | 4/2011 | Altonen et al. | |
| 2011/0198371 A1 | 8/2011 | Law et al. | |
| 2012/0097714 A1 | 4/2012 | Hoefte et al. | |
| 2013/0270301 A1 | 10/2013 | Schoubben et al. | |
| 2014/0008398 A1 | 1/2014 | Law et al. | |
| 2014/0231462 A1 | 8/2014 | Ray et al. | |

FOREIGN PATENT DOCUMENTS

| | | |
|---|---|---|
| WO | 2017003568 A1 | 1/2017 |
| WO | 2017004011 A1 | 1/2017 |

* cited by examiner

MEASURED DOSE DISPENSERS AND METHODS OF USING THE SAME

BACKGROUND OF THE INVENTION (1) Field of the Invention

The instant invention relates to dispensing closures for containers for flowable products such as personal care products, concentrated beverages, food products, home and garden chemical products, healthcare products, etc. More specifically, the invention relates to a dispensing closure having an interior measuring reservoir which is automatically filled with a measured dose of the flowable product when the container is inverted, and dispenses the measured dose of product from the measuring reservoir when the container is squeezed.

(2) Description of Related Art

Dispensing containers are used in a variety of industries for dispensing various liquid or flowable products. As integrated dispensing closures become more prevalent in all industries consumer desire presses for their use on an ever expanding array of products and packages, while product manufacturers search for unique solutions at the lowest possible cost to promote sales and maintain profit margins.

SUMMARY OF THE INVENTION

The instant invention is directed to a dispensing closure for dispensing a measured dose of a flowable product from a squeeze-type product container. Generally, the product container is molded from a flexible plastic and is sufficiently pliable such that the user may readily squeeze the container to apply pressure to the flowable product contained therein.

An exemplary embodiment of the dispensing closure for dispensing a fixed volume or dose of flowable product comprises a closure body, a closure lid connected to the closure body by a living hinge, a measuring reservoir, a piston valve movable within the measuring reservoir, and a spring for biasing the piston valve.

The closure body has an upper deck, a centrally located exit orifice, and a flow conduit in communication with the exit orifice which depends downwardly from the upper deck to provide a flow path from an entrance orifice at a lower end thereof to the exit orifice. The closure body further includes an inner mounting skirt depending downwardly from the upper deck and an outer decorative skirt shaped to blend with the outside shape of the product container. The inner skirt includes threads for engagement with a threaded neck of the product container.

The cup-shaped measuring reservoir has a bottom wall, a cylindrical sidewall extending up from the bottom wall, and an upper peripheral edge received in snap-fitting engagement with a mounting rim on a lower surface of the upper deck. The mounting rim encircles the flow conduit such that the measuring reservoir surrounds the flow conduit. The measuring reservoir has a plurality of flow ports adjacent to the upper peripheral edge to allow the flowable product into the measuring reservoir. In use, the measuring reservoir fills with a measured dose of flowable product through the flow ports when the container is inverted. The bottom wall also includes a plurality of pressure apertures through which product moves during dispensing and refilling.

The cup-shaped piston valve has a bottom wall and a valve stem extending upwardly from the bottom wall, the piston valve being slidably movable within the measuring reservoir between an open position and a closed position. In the open position, the valve stem is spaced from a valve seat formed at an entrance orifice of the flow conduit whereby flowable product can enter the measuring reservoir through the flow ports and exit through the flow conduit. In the closed position, the valve seat is in mating engagement with the valve seat closing the flow conduit and preventing the flowable product from exiting the exit orifice.

A coil spring resides within the measuring reservoir where it encircles the flow conduit and the valve stem and is captured between the lower surface of the upper deck and the bottom wall of the piston valve. The spring normally biases the piston valve to its open resting position.

In operation, the piston valve remains in the open at rest position. To fill the measuring reservoir with a measured dose of flowable product, the container is inverted where the flowable product enters and fills the measuring reservoir through the flow ports adjacent the lower surface of the upper deck. The product within the measuring reservoir is now ready for dispensing. Dispensing of the measured dose is accomplished by squeezing the container to produce pressure within the container. Continuous pressure within the container forces flowable product through the pressure ports into the measuring reservoir beneath the bottom wall of the piston valve, and forces the piston valve to move from the open position towards the closed position and in doing so to dispense the measured dose of product through the flow conduit and out the exit orifice. When the piston valve reaches the closed position, the valve stem engages the valve seat on the bottom end of the flow conduit and the upper peripheral edge of the cup wall engages the lower surface of the upper deck to fully close the conduit and complete the dispensing cycle.

The release of pressure from the container allows the coil spring to expand and force the piston valve back to the normal at rest position. The reverse motion of the piston valve creates a suck-back effect at the exit orifice preventing any product from dripping from the exit orifice once the squeezing pressure is released.

The amount of the measured dose can be adjusted by varying the size of the measuring reservoir, the size of the flow ports and the size of the pressure apertures.

A second exemplary embodiment provides an adjustable size measuring reservoir which allows the user to dispense an adjustable dose of product. This adjustable embodiment comprises a measuring reservoir, a dispensing cap mounted on the measuring reservoir, a piston valve movable within the measuring reservoir and a spring for biasing the piston valve.

The measuring reservoir has a bottom wall, a cylindrical side wall with an upper peripheral edge, and a reservoir skirt extending outward and downwardly from the peripheral edge. The reservoir skirt has inward threads for engagement with an outward threaded neck of a product container.

The measuring reservoir has a plurality of flow ports adjacent the upper edge to allow the flowable product into the measuring reservoir when inverted. The bottom wall also includes cylindrical, axially located guide stem extending upwardly and a plurality of pressure apertures through which product moves during dispensing and filling or refilling.

The dispensing cap has an upper deck, a centrally located exit orifice and a flow conduit in communication with the exit orifice which depends downwardly from the upper deck to provide a flow path from an entrance orifice at a lower end thereof to the exit orifice. The cap further includes an inner skirt wall depending downward from the upper deck wherein an outer surface of the inner skirt wall is received in sliding engagement with an inner surface of the upper peripheral edge of the side wall of the measuring reservoir. The sliding engagement between these walls allows the measuring reservoir and the dispensing cap axially slide relative to each other and cooperate to define an adjustable reservoir volume. In operation, a minimum volume dispense position is defined when the upper deck engages the upper peripheral edge of the measuring reservoir and a maximum volume dispense position is defined when the upper deck is moved away from the upper edge of the measuring reservoir. In order to create this movement, the dispensing cap further includes an outer skirt depending downwardly from upper deck where the outer skirt has an inward thread that engages with an outward thread on the reservoir skirt. In this regard, the dispensing cap is rotatably movable relative to said measuring reservoir to linearly translate the dispensing cap between the minimum volume dispense position and the maximum volume dispense position.

The cup-shaped piston valve has a bottom wall and a valve stem extending upwardly from the bottom wall. The valve stem is slidably received within the measuring reservoir and movable within the measuring reservoir between an open position and a closed position. In the open position, the valve stem is spaced from a valve seat formed at an entrance orifice of the flow conduit whereby flowable product can enter the measuring reservoir through the flow ports and exit through the flow conduit. In the closed position, the valve stem is in mating engagement with the valve seat and the upper peripheral edge of the cup wall engages the lower surface of the upper deck thereby closing the flow conduit and preventing the flowable product from exiting the exit orifice.

The coil spring resides within the measuring reservoir where it encircles the flow conduit and the valve stem and is captured between the lower surface of the upper deck of the dispensing cap and the bottom wall of the piston valve. The spring normally biases the piston valve to its open resting position. The piston valve is movable from its normal open position to the closed position to dispense the measured dose of product responsive to pressure within the container induced by squeezing the container.

Dispensing operation is otherwise the same as in the fixed dose embodiment.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
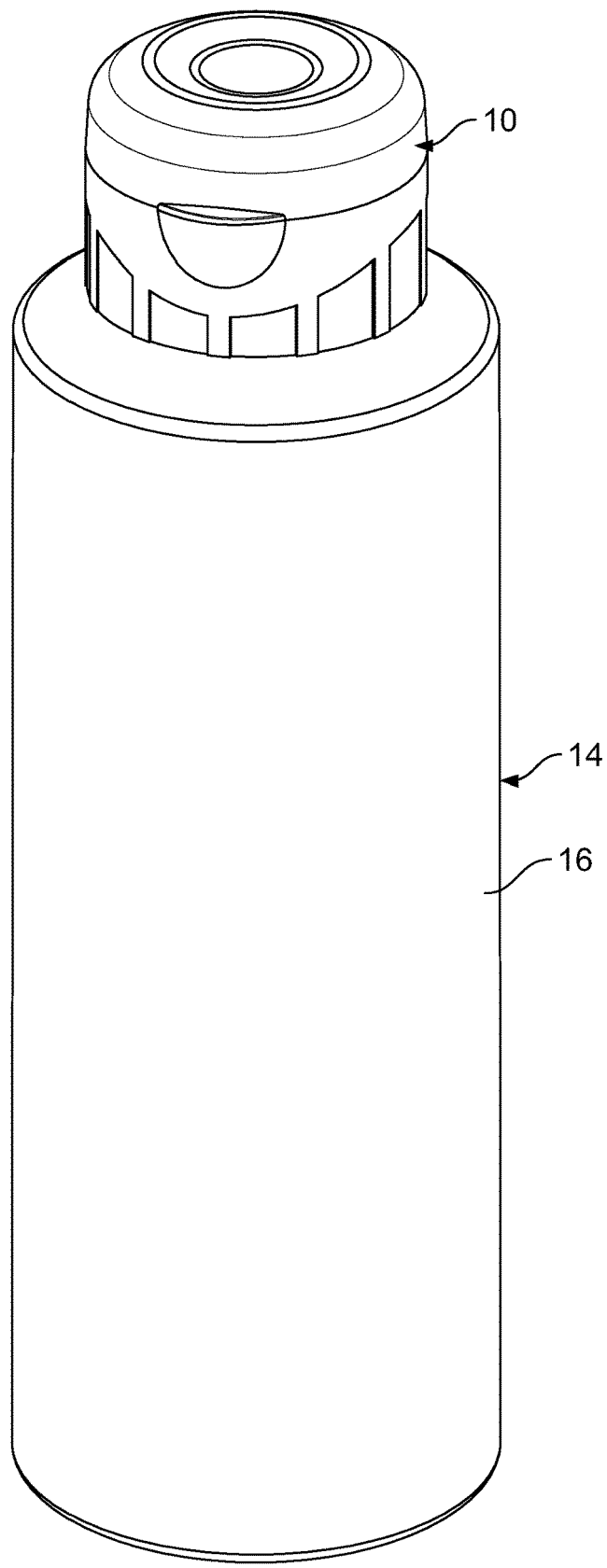
FIG. 1 is a perspective view of an exemplary embodiment of the dispensing closure mounted on a squeeze-type product container.
Figure 2:
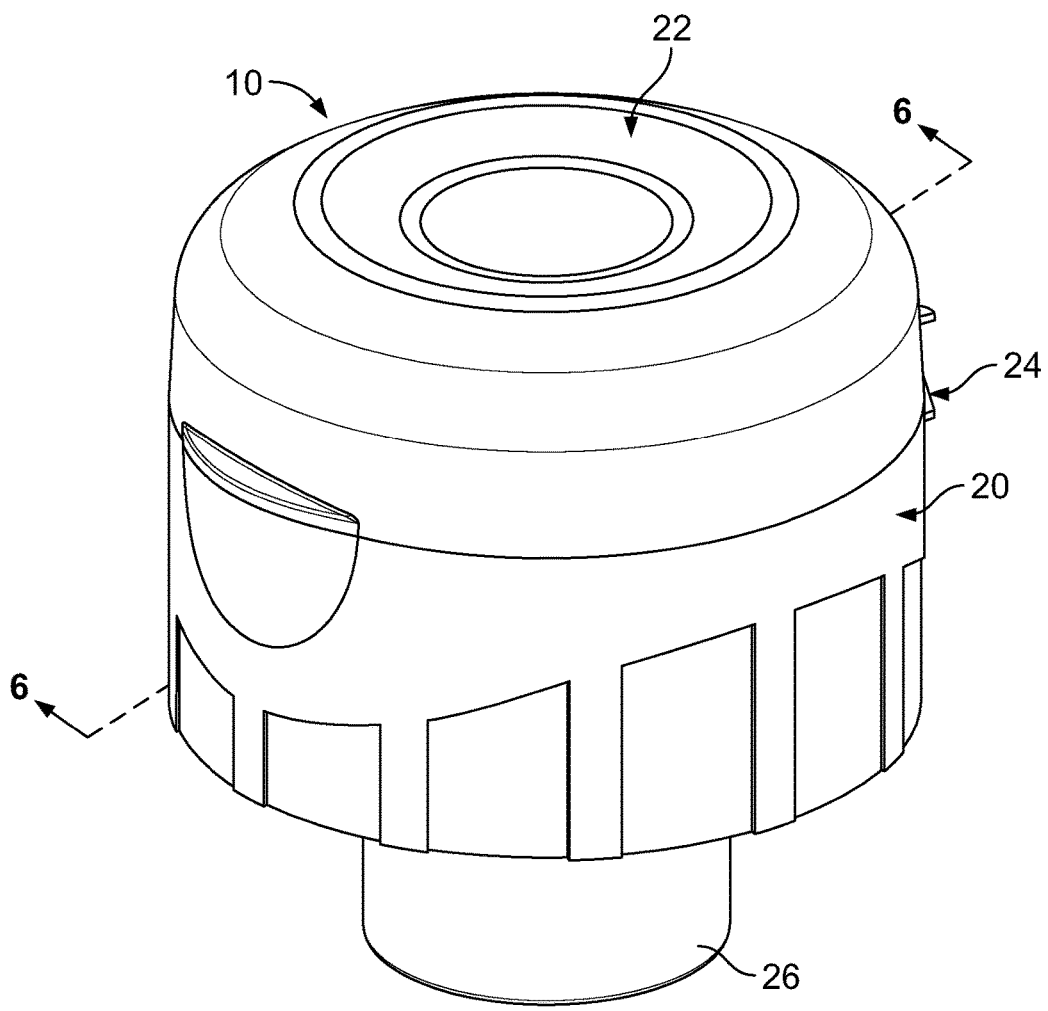
FIG. 2 is a top perspective view of the dispensing closure.
Figure 3:
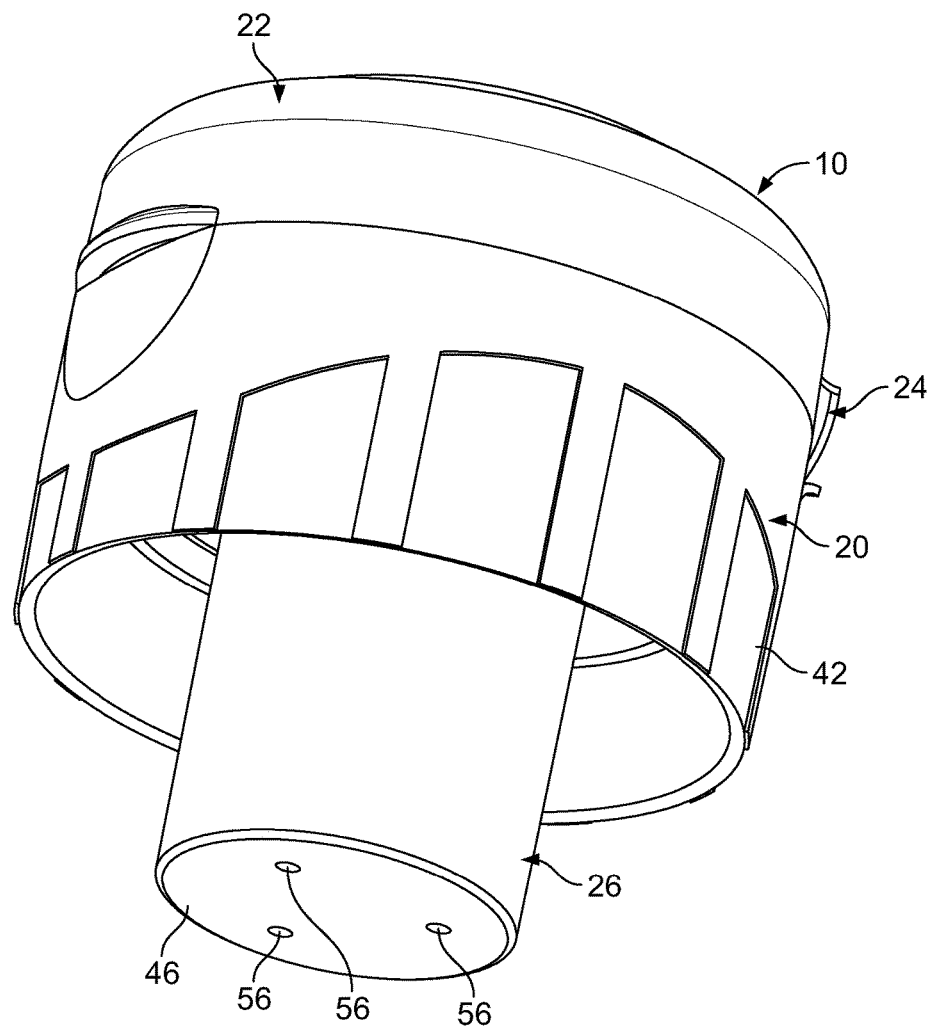
FIG. 3 bottom perspective view thereof.

Referring now to the drawings, an exemplary embodiment of the invention is generally indicated at 10 in FIGS. 1-10.

The instant invention is directed to a dispensing closure 10 for dispensing a measured dose of a flowable product 12 from a squeeze-type product container 14.

Generally, the product container 14 is molded from a flexible plastic and has a main body portion 16 which is sufficiently pliable such that the user may readily squeeze the container 14 to apply pressure to the flowable product 12 contained therein. Preferably, the container 14 also may include a threaded neck 18.

The dispensing closure 10 comprises a closure body 20, a closure lid 22 connected to the closure body 20 by a living hinge 24, a measuring reservoir 26, a piston valve 28 movable within the measuring reservoir 26, and a spring 30 for biasing the piston valve 28 to a normally open position. The dispensing closure 10, closure lid 22, measuring reservoir 26 and piston valve 28 are preferably molded from plastic, while the spring 30 is preferably stainless steel. Other materials as suitable for the flowable product are also contemplated.

The closure body 20 has an upper deck 32, a centrally located exit orifice 34, and a flow conduit 36 in fluid communication with the exit orifice 34. The flow conduit 36 depends downwardly from the upper deck 32 to provide a flow path from an entrance orifice 38 at a lower end thereof upwardly to the exit orifice 34. The closure body 20 further includes an inner mounting skirt 40 depending downwardly from the upper deck 32 and an outer decorative skirt 42 shaped to blend with the outside shape of the product container 14. The inner skirt 40 includes threads for engagement with the threaded neck 18 of the product container 14.

Figure 4:
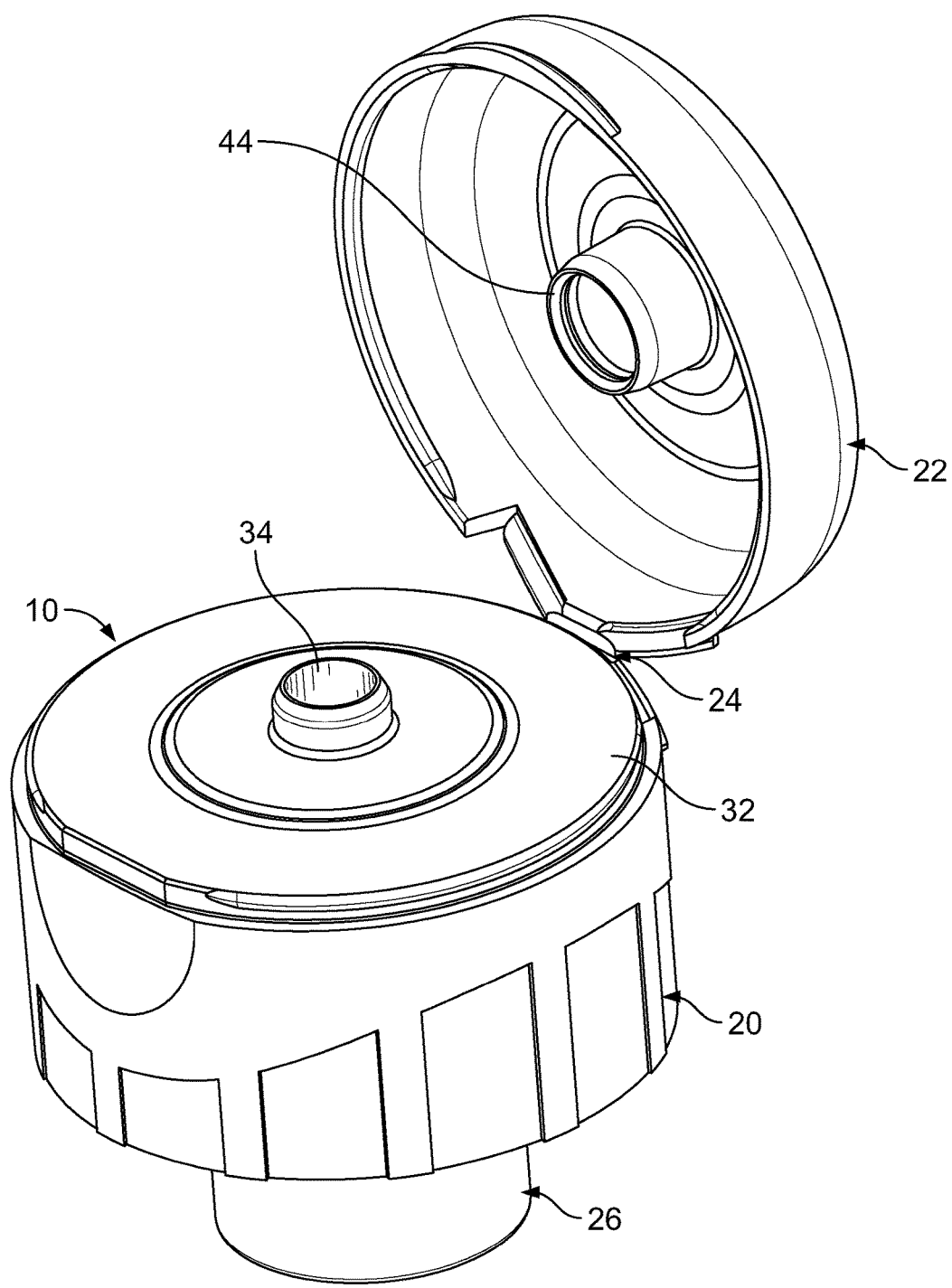
FIG. 4 is another perspective view thereof with the closure lid open.
Figure 6:
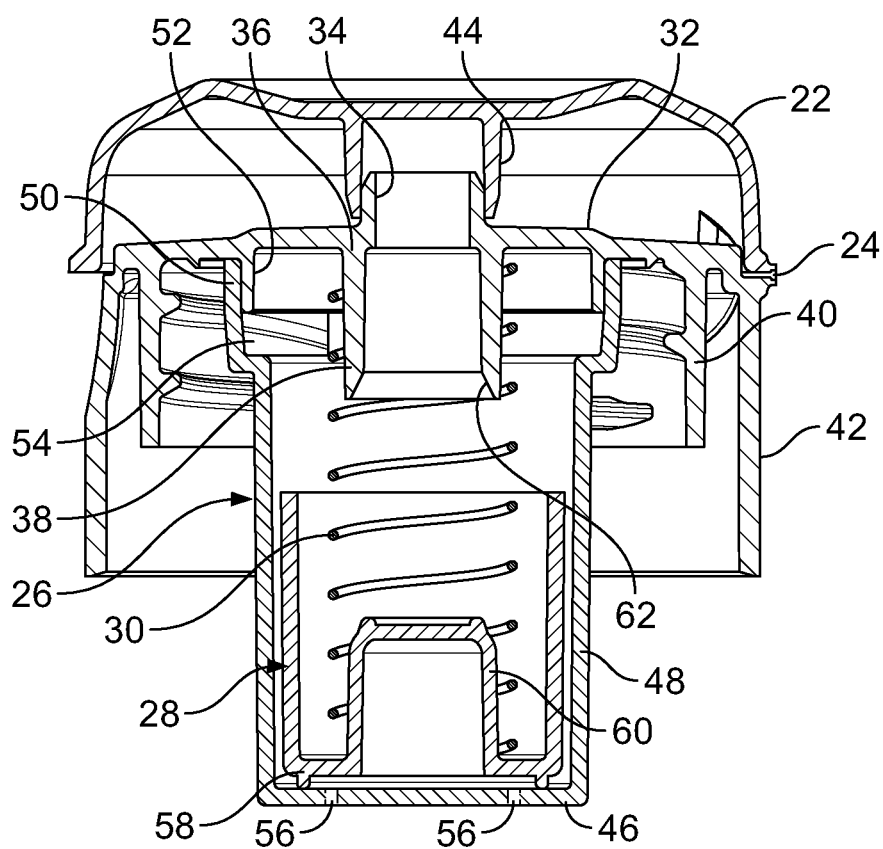
FIG. 6 is a cross-sectional view thereof taken along line 6-6 of FIG. 2.

The closure lid 22 is movable between a closed position (FIGS. 1-3) and an open position (FIGS. 4 and 6). The lid 22 includes a sealing structure 44 on the underside of the top wall which is received in interfitting engagement with the exit orifice 34 to selectively prevent flowable product from exiting the exit orifice 34 when the lid 22 is closed (See FIG. 6).

Figure 5:
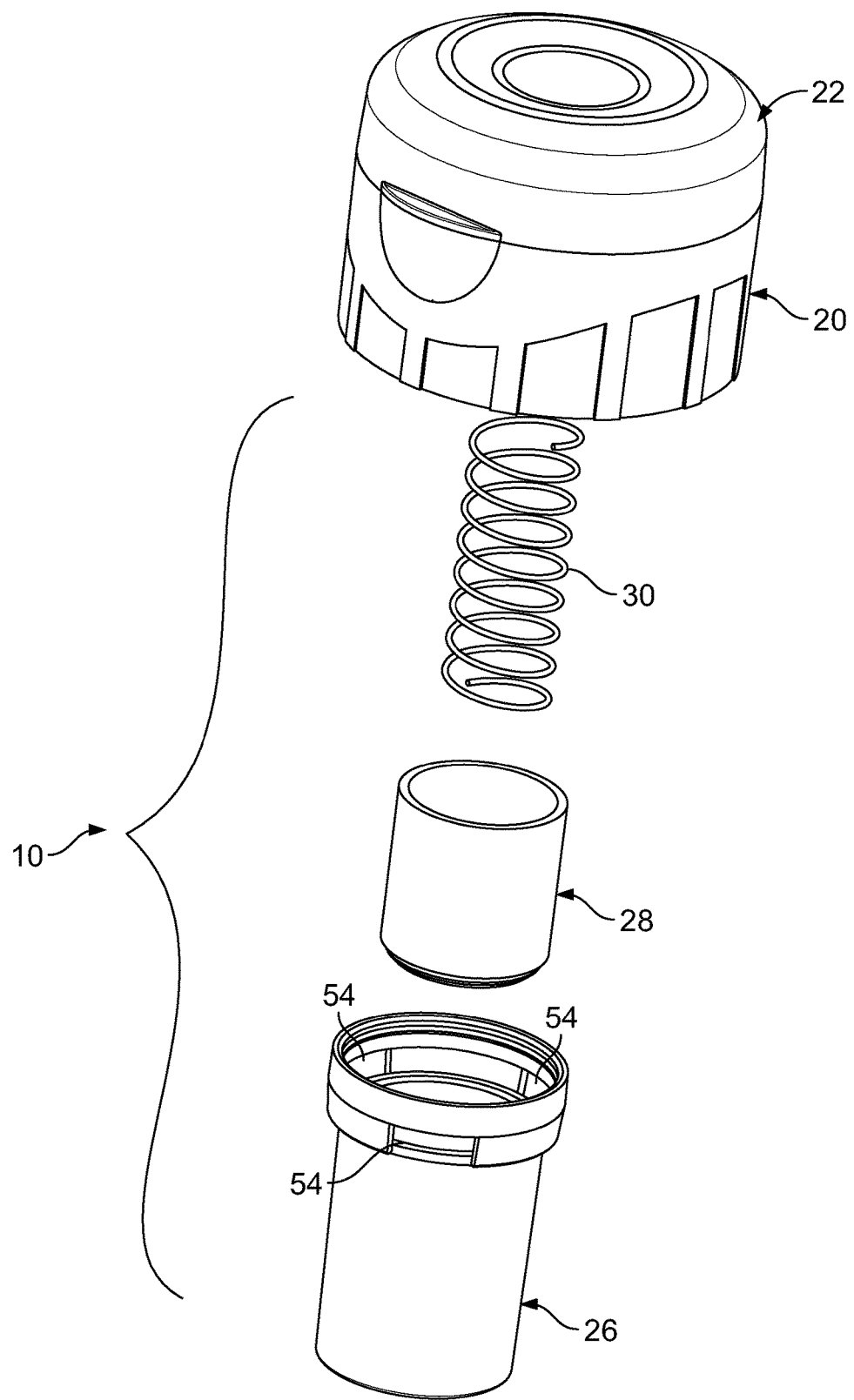
FIG. 5 is an exploded perspective view showing the components of the exemplary dispensing closure.

Referring to FIGS. 5 and 6, the cup-shaped measuring reservoir 26 has a bottom wall 46, a cylindrical sidewall 48 extending up from the bottom wall 46, and an upper peripheral edge 50 received in snap-fitting engagement with a concentric, annular mounting rim 52 on a lower surface of the upper deck 32. The mounting rim 52 encircles the flow conduit 36 such that the measuring reservoir 26 encircles and surrounds the flow conduit 36. The measuring reservoir 26 has a plurality of flow ports 54 (best seen in FIG. 5) adjacent to the upper peripheral edge to allow the flowable product into and out of the measuring reservoir 26. In use, the measuring reservoir 26 fills with a measured (fixed volume) dose of flowable product through the flow ports 54 when the container 14 is inverted. The bottom wall 46 also includes a plurality of pressure apertures 56 through which product moves during dispensing and refilling.

Figure 7:
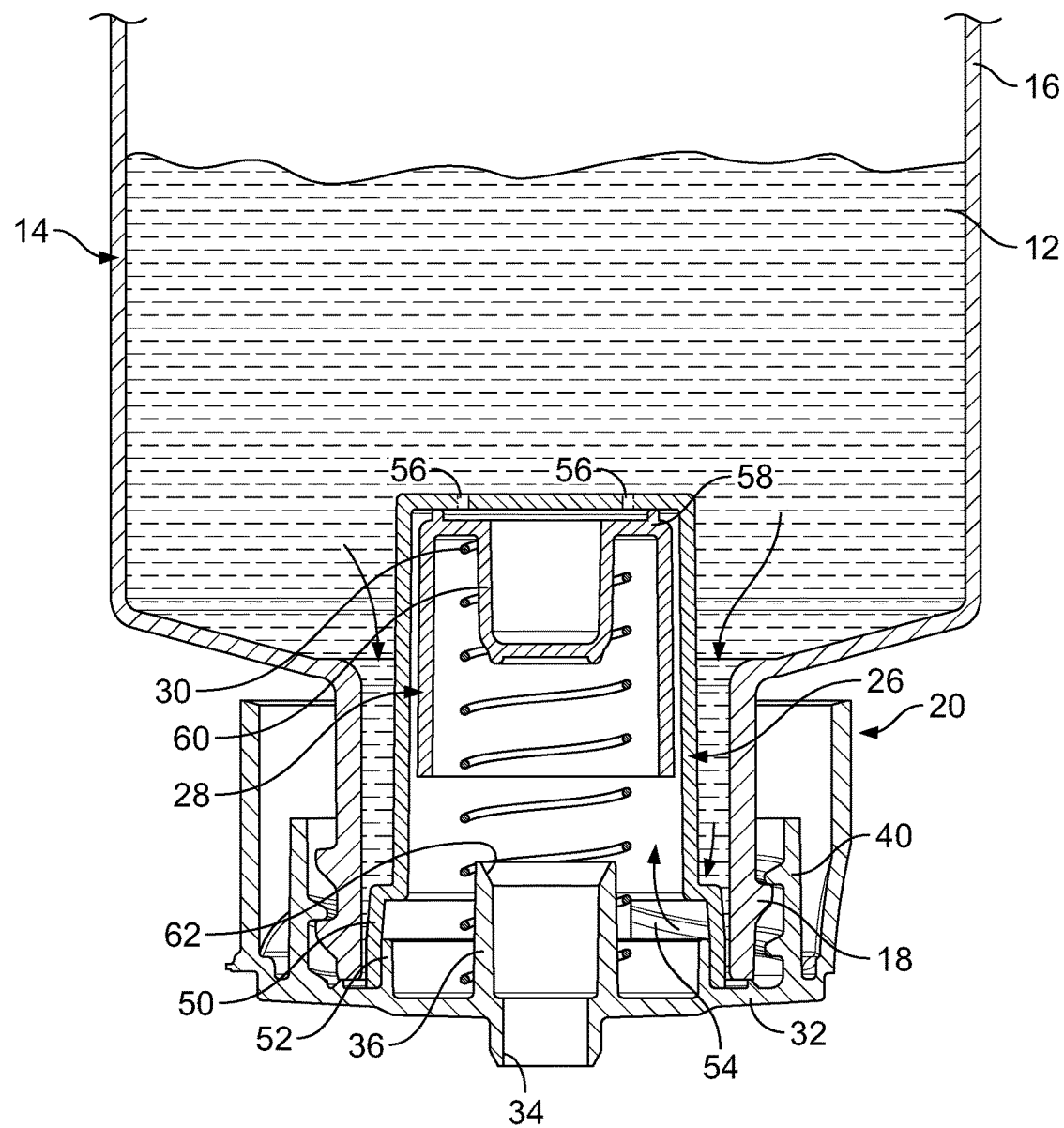
FIG. 7 is a cross-section view showing the dispensing closure inverted and the piston valve an at-rest open position.
Figure 8:
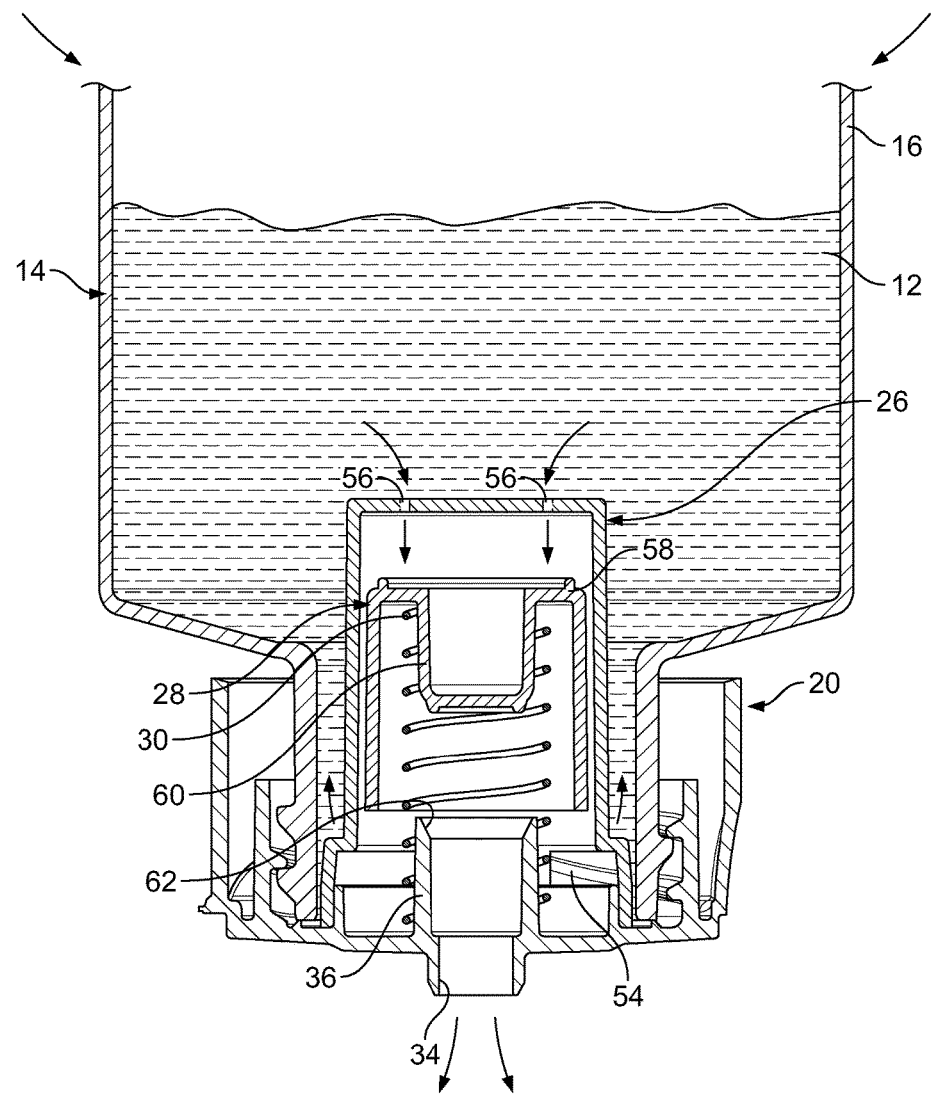
FIG. 8 is another view thereof with the container being squeezed to dispense the product.
Figure 9:
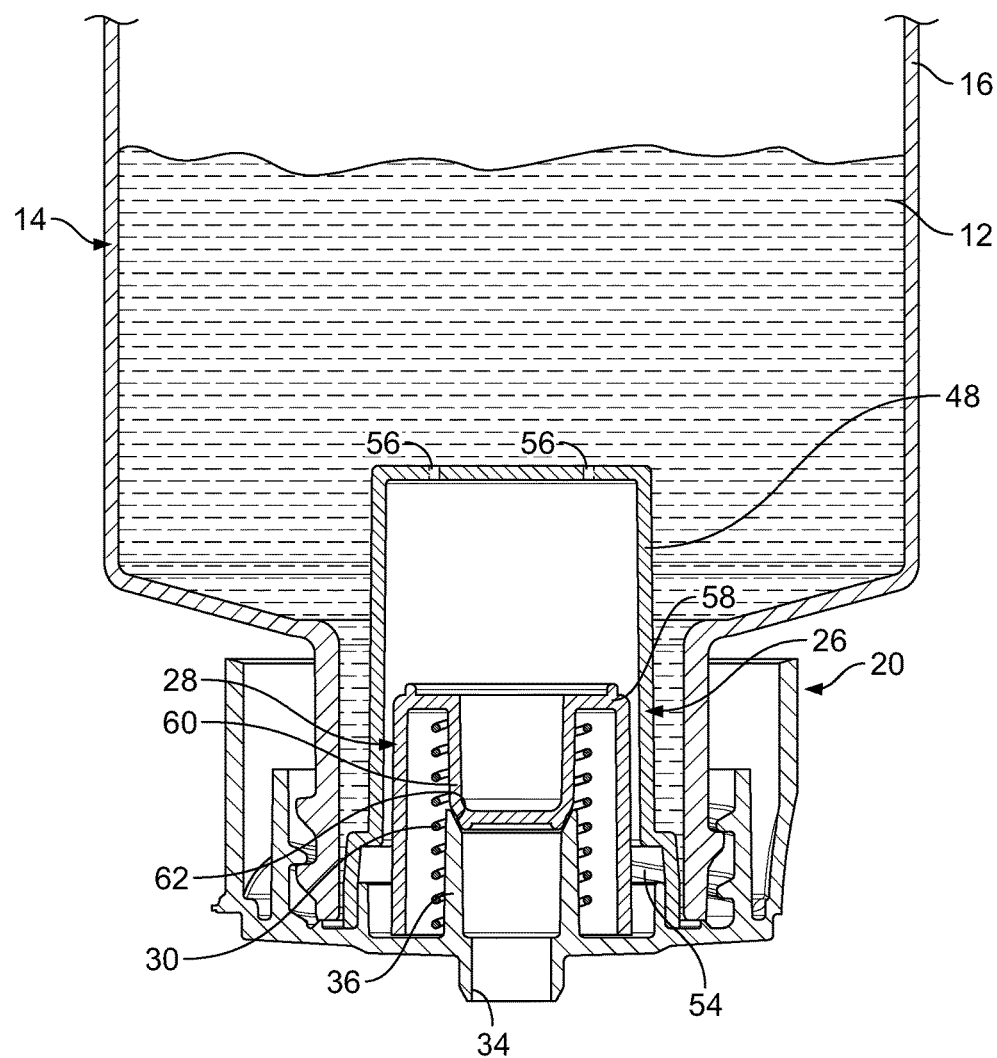
FIG. 9 is still another view thereof with the piston valve fully closed at the end of the dispensing stroke.
Figure 10:
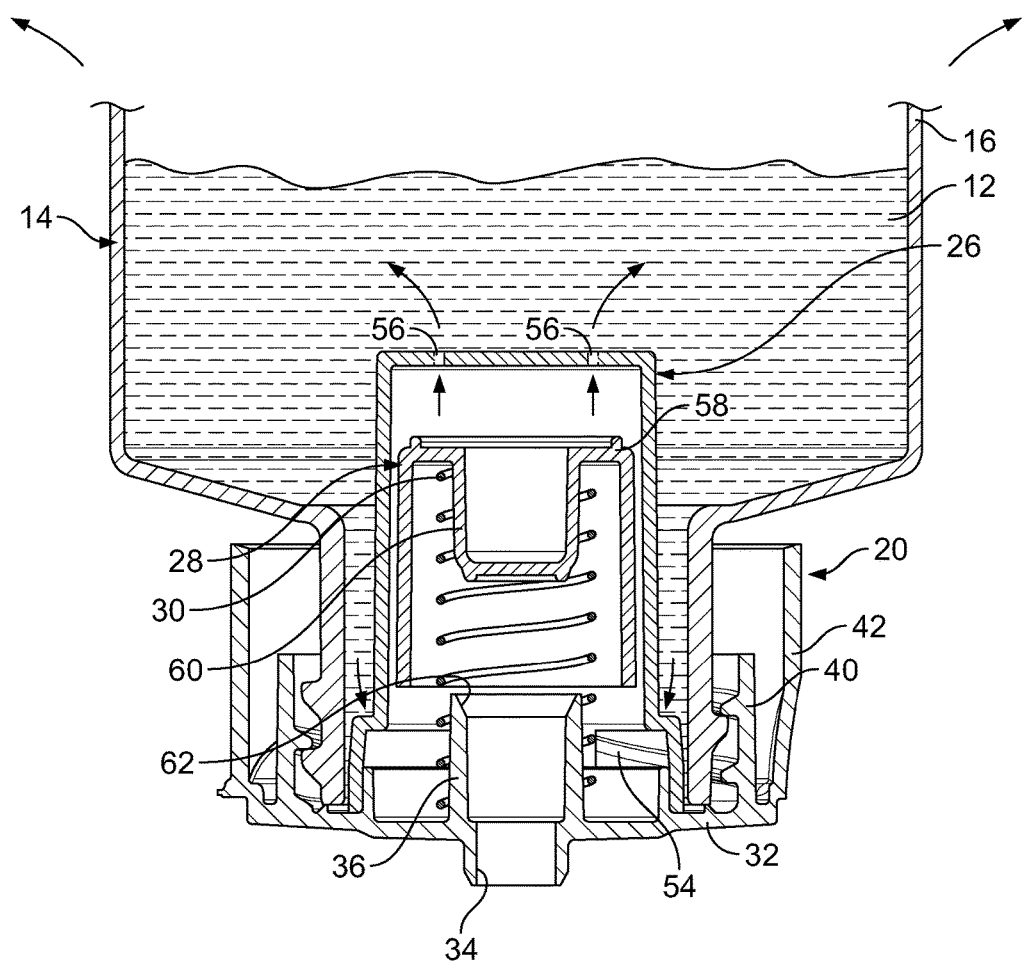
FIG. 10 is yet another view thereof of the piston valve being returned to the open position after releasing pressure on the container.
Figure 11:
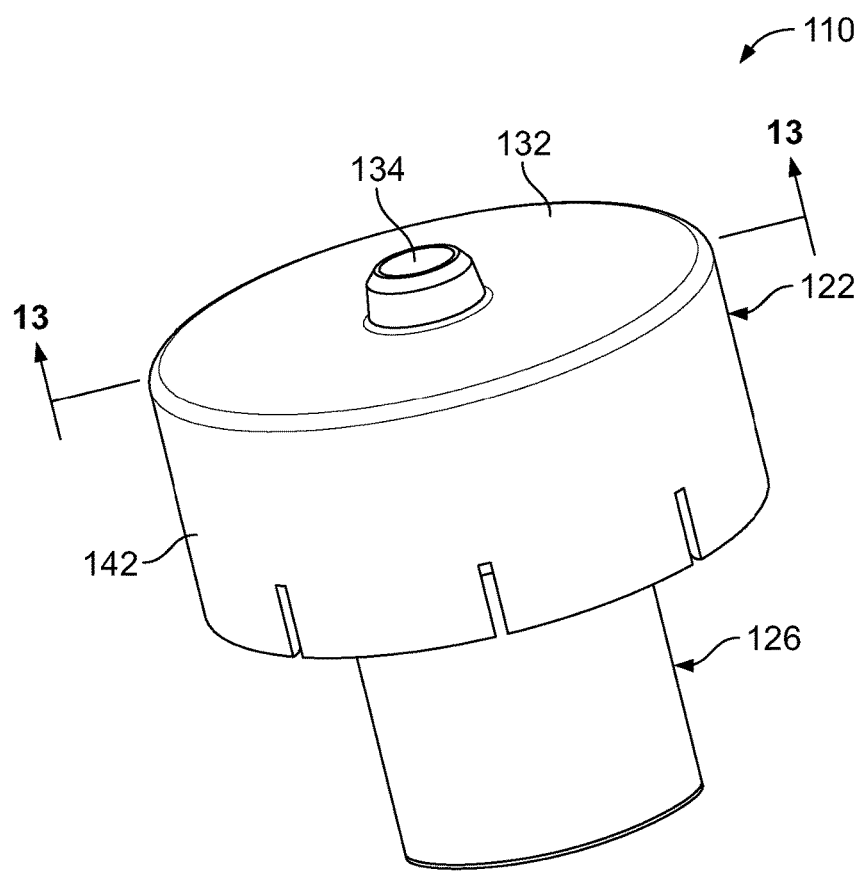
FIG. 11 is a perspective view of another exemplary embodiment showing a dispensing closure with an adjustable measuring reservoir.

Referring to FIGS. 5-10, the cup-shaped piston valve 28 has a bottom wall and a valve stem 60 extending upwardly from the bottom wall 58, the piston valve 28 being slidably movable within the measuring reservoir 26 between an open position (FIGS. 6-7) and a closed position (FIG. 9). The closure lid 22 is omitted from FIGS. 7-10 for clarity. In the open position (FIG. 7), the valve stem 60 is spaced from a valve seat 62 formed at an entrance orifice 38 of the flow conduit 36 whereby flowable product 12 can enter the measuring reservoir 26 through the flow ports 54 and exit through the flow conduit 36 (see arrows). In the closed position (FIG. 9), the valve stem 60 is in mating engagement with the valve seat 62 and the upper peripheral edge of the piston cup wall engages the lower surface of the upper deck 32 closing the flow conduit 36 and preventing the flowable product 12 from exiting the exit orifice 34.

The coil spring 30 resides within the measuring reservoir 26 where it encircles the flow conduit 36 and the valve stem 60 and is captured between the lower surface of the upper deck 32 and the bottom wall 58 of the piston valve 28. The spring 30 normally biases the piston valve 28 to its open resting position (FIG. 7).

In operation, the piston valve 28 begins its cycle in the open at rest position (FIG. 6). To fill the measuring reservoir 26 with a measured dose of flowable product 12, the container 14 is inverted (FIG. 7) where the flowable product 12 enters and fills the measuring reservoir 26 through the flow ports 54 adjacent the lower surface of the upper deck 32. The product 12 within the measuring reservoir 26 is now ready for dispensing. Dispensing of the measured dose is accomplished by squeezing the container 14 to produce pressure within the container 14 (FIG. 8). Continuous pressure within the container 14 forces flowable product 12 through the pressure apertures 56 into the measuring reservoir 26 beneath the bottom wall 58 of the piston valve 28, and forces the piston valve 28 to move from the open position (FIG. 7) towards the closed position (FIG. 8), and in doing so, to dispense the measured dose of product 12 through the flow conduit 36 and out the exit orifice 34. When the piston valve 28 reaches the closed position (FIG. 9), the valve stem 60 engages the valve seat 62 on the bottom end of the flow conduit 36 and the upper peripheral edge of the cup wall engages the lower surface of the upper deck 32 to fully close the flow conduit 36 and complete the dispensing cycle.

The release of pressure from the container 14 (FIG. 10) allows the coil spring 30 to expand and force the piston valve 28 back towards the normal at rest position. Flowable product 12 again enters the measuring reservoir 26 through the flow ports 54 while flowable product 12 is also returned to the container 14 through the pressure apertures 56. The reverse motion of the piston valve 28 creates a "suck-back" effect at the exit orifice 34 preventing any product 12 from dripping from the exit orifice 34 after the squeezing pressure is released. Once uprighted, a small amount of product 12 will normally remain within the piston valve 28.

The amount of the measured dose and the speed of dispensing and refilling can be easily adjusted by one skilled in the art by varying the size of the measuring reservoir 26, the size of the piston valve 28, the size of the flow ports 54 and the size of the pressure apertures 56.

A second exemplary embodiment 110 is illustrated in FIGS. 11-17 and provides an adjustable size measuring reservoir which allows the user to dispense an adjustable dose of product. This adjustable embodiment 112 comprises a measuring reservoir 126, a dispensing cap 122 mounted on the measuring reservoir 126, a piston valve 128 movable within the measuring reservoir 126 and a spring 130 for biasing the piston valve 128. In general terms, the adjustable measured dose is provided by mounting the measuring reservoir 126 on the container 14 and allowing the dispensing cap 122 to slidably move relative to the measuring reservoir 126 to change the volume of the measuring reservoir.

The measuring reservoir 126 has a bottom wall 146, a cylindrical side wall 148 with an upper peripheral edge 150, and a reservoir skirt 140 extending outward and downwardly from the peripheral edge. The reservoir skirt 140 has inward threads 141 for engagement with an outward threaded neck 18 of a product container 14.

Figure 12:
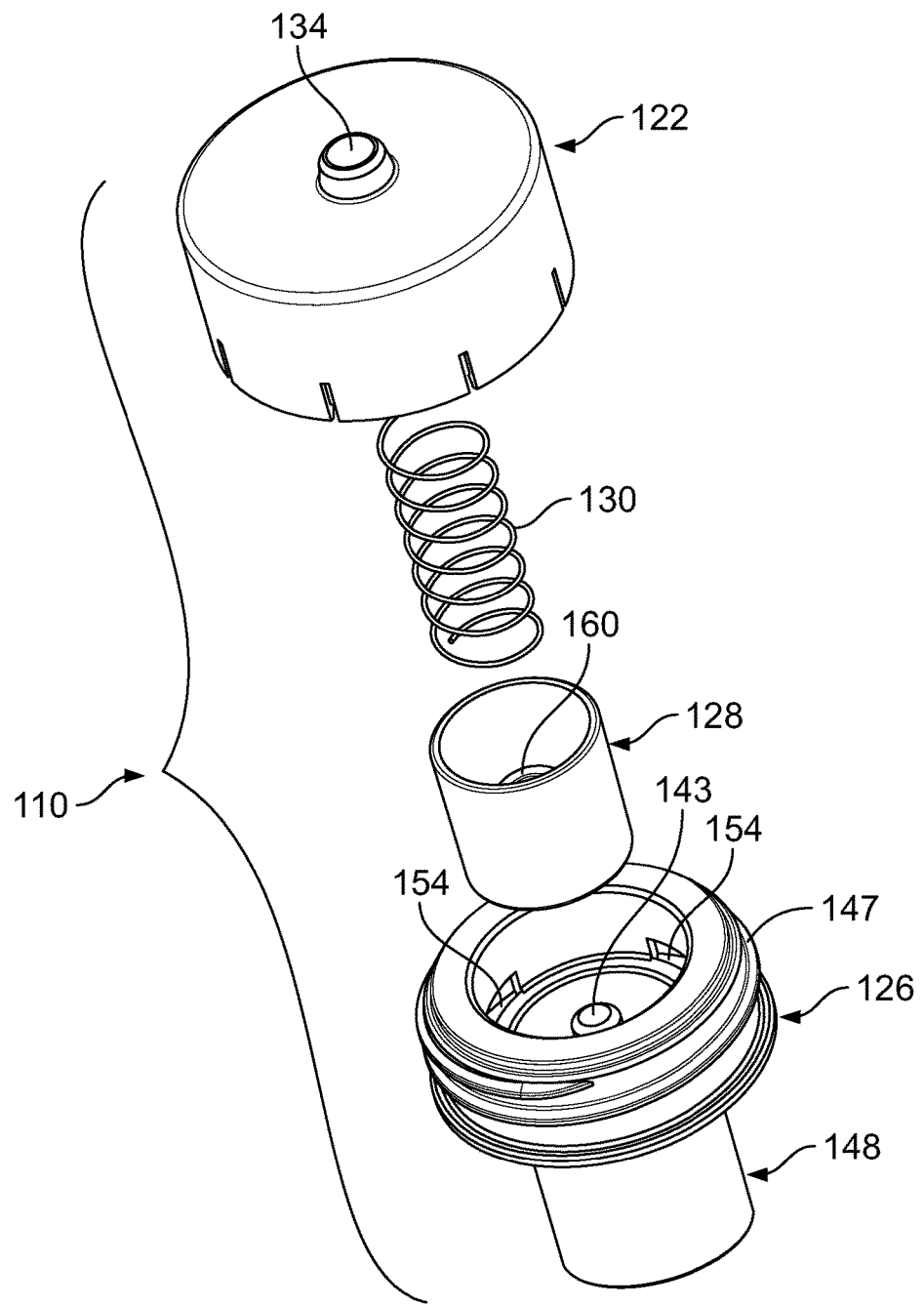
FIG. 12 is an exploded perspective view thereof.

The measuring reservoir 126 has a plurality of flow ports 154 adjacent the upper edge 150 to allow the flowable product 12 into the measuring reservoir 126 when inverted (See FIG. 12). The bottom wall 146 includes a plurality of pressure apertures 156 through which product 12 moves during dispensing and filling or refilling.

Figure 14:
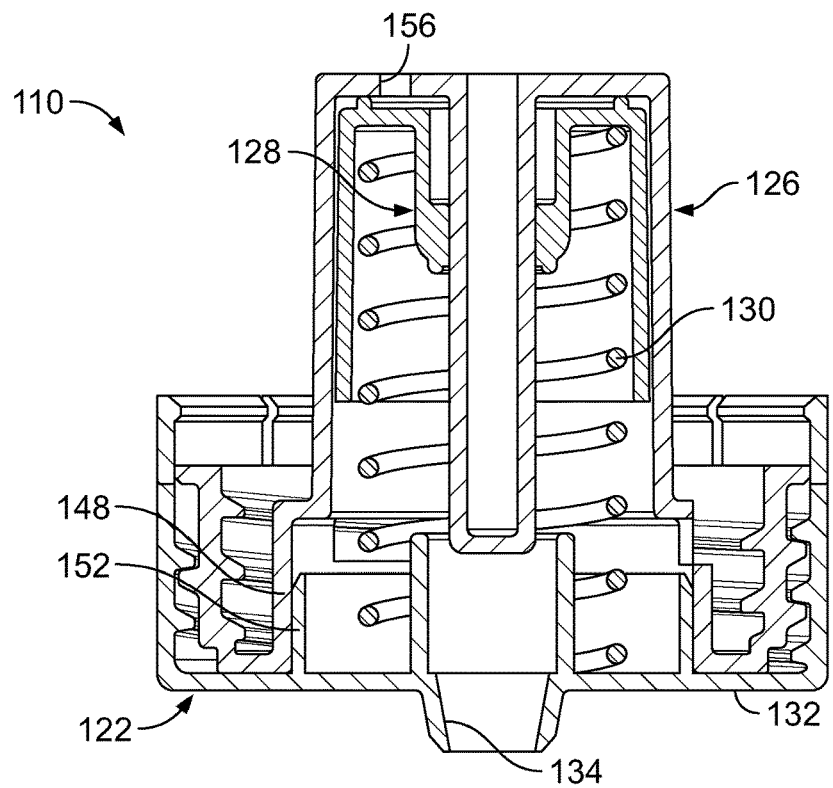
FIG. 14 is a cross-sectional view showing the dispensing closure inverted, the outer adjustment cap rotated to a minimum dispense position, and the piston valve at an at-rest position.
Figure 15:
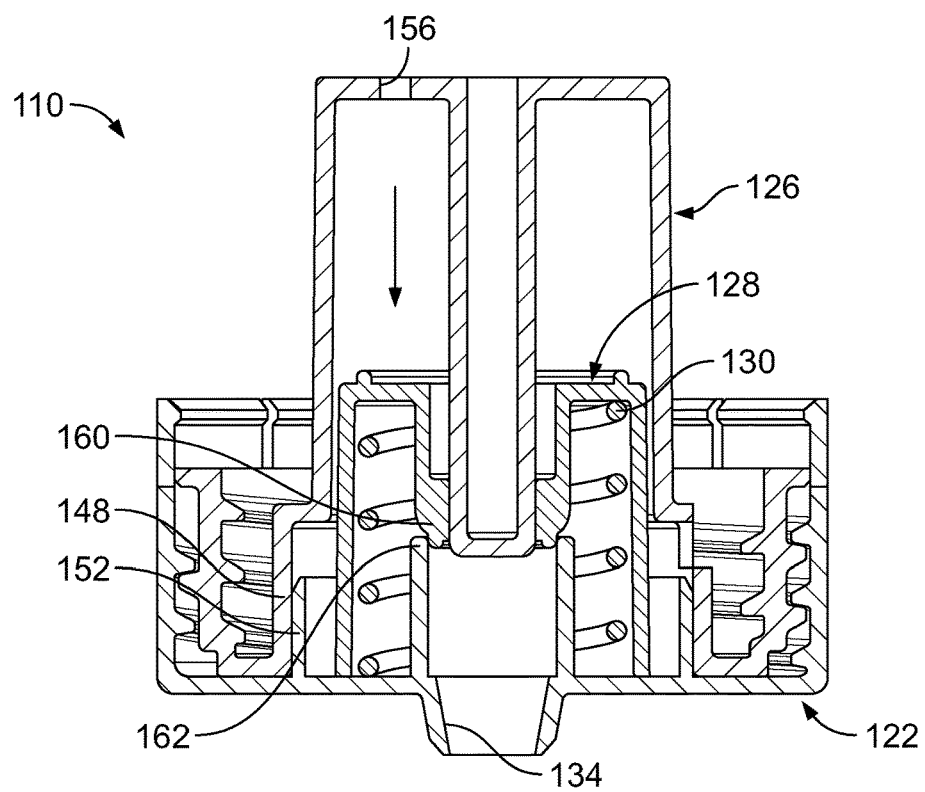
FIG. 15 is another view thereof with the container being squeezed and the piston valve fully closed at the end of the dispensing stroke.
Figure 16:
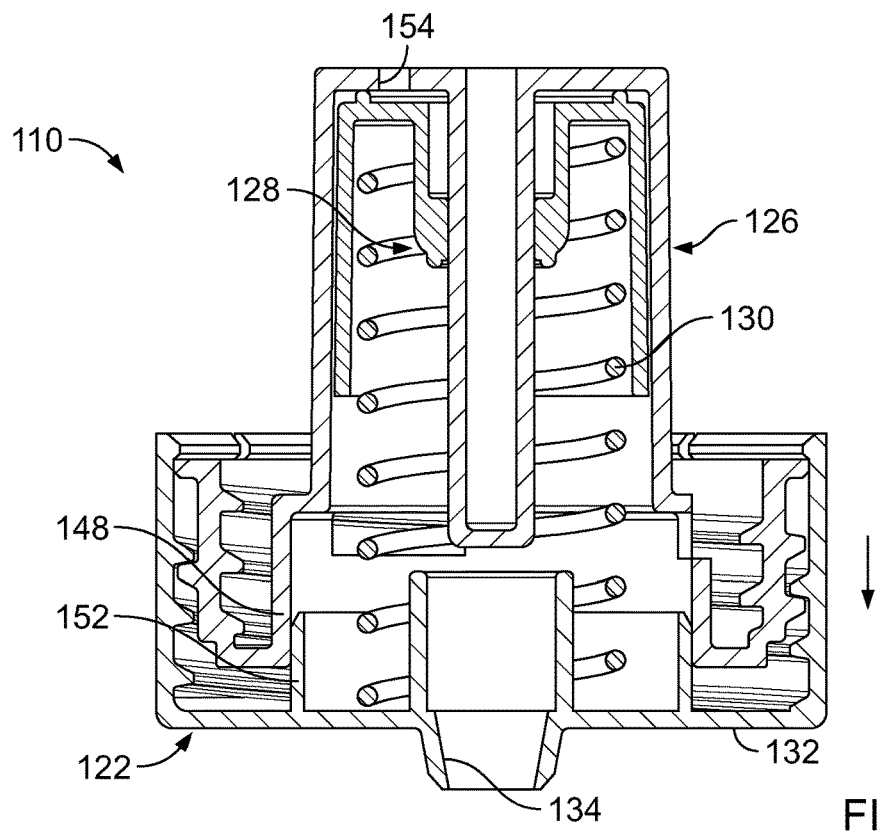
FIG. 16 is a cross-sectional view showing the dispensing closure inverted, the outer adjustment cap rotated to a maximum dispense position, and the piston valve at an at-rest position.
Figure 17:
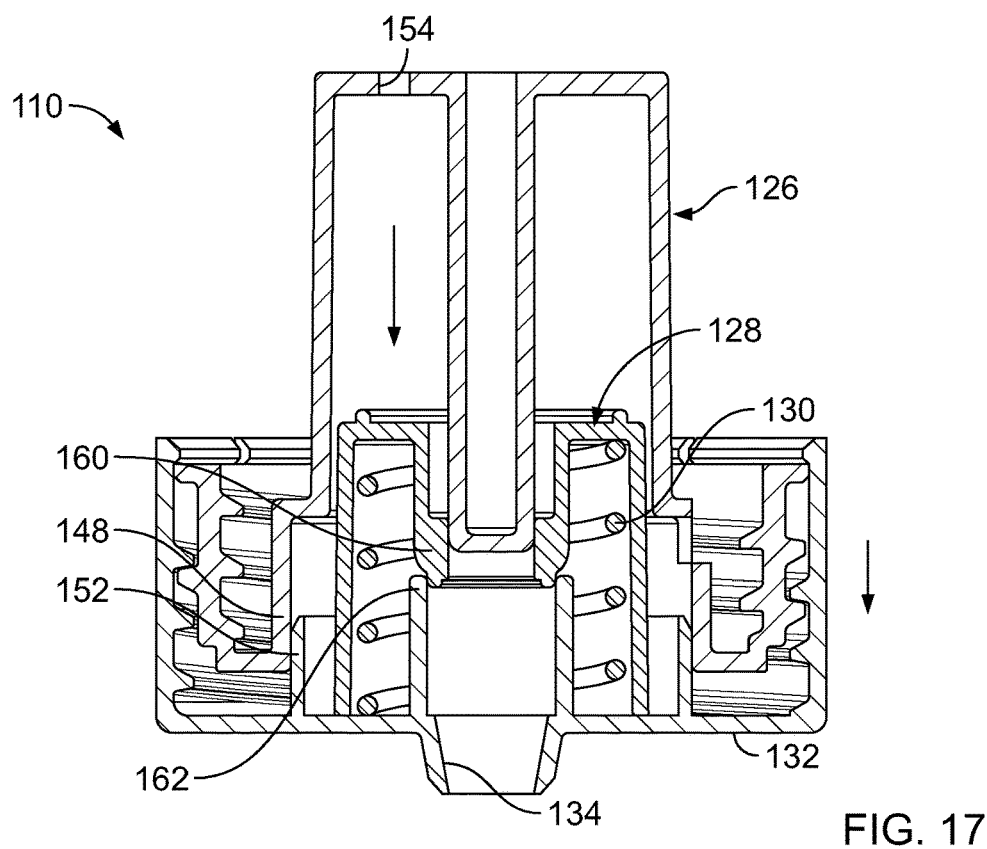
FIG. 17 is another view thereof with the container being squeezed and the piston valve fully closed at the end of the dispensing stroke.

The dispensing cap 122 has an upper deck 132, a centrally located exit orifice 134 and a flow conduit 136 in communication with the exit orifice 134 which depends downwardly from the upper deck 132 to provide a flow path from an entrance orifice 138 at a lower end thereof to the exit orifice 134. The cap 122 further includes an inner skirt wall 152 depending downward from the upper deck 132 wherein an outer surface of the inner skirt wall 152 is received in sliding engagement with an inner surface of the upper portion of the side wall 148 of the measuring reservoir 126. The sliding engagement between these walls 148/152 allows the measuring reservoir 126 and the dispensing cap 122 to axially slide relative to each other and cooperate to define an adjustable reservoir volume (See FIGS. 14-17). In operation, a minimum volume dispense position (FIGS. 14-15) is defined when the upper deck 132 engages the upper peripheral edge 150 of the measuring reservoir 126 and a maximum volume dispense position (FIGS. 16-17) is defined when the upper deck 132 is moved axially away from the upper edge 150 of the measuring reservoir 126. In order to create this movement, the dispensing cap 122 further includes an outer skirt 142 depending downwardly from upper deck 132 where the outer skirt 142 has an inward thread 145 that engages with an outward thread 147 on the reservoir skirt 140. In this regard, the dispensing cap 122 is rotatably movable relative to the measuring reservoir 126 to linearly translate the dispensing cap 122 between the minimum volume dispense position (FIGS. 14-15) and the maximum volume dispense position (FIGS. 16-17). It should be noted that the dispensing cap 122 can also be rotatably positioned at a plurality of intermediate volume positions (not shown) between the minimum and and maximum positions to further provide a variety of different dispensing volumes.

It is further contemplated that the dispensing cap 122 and the measuring reservoir 126 could include alternate structure(s) which would allow them to move between these minimum and maximum volume positions or other intermediate positions. For example, the walls 148/152 could be formed with a push-pull snap bead arrangement where the dispensing cap 122 was simply pulled outward to the maximum dispense position and pushed back inwardly to the minimum dispense position. In this regard, the outer skirt would not be required and the outer thread on the reservoir skirt would also not be required. The adjustment concept should not be limited by the exemplary embodiments.

The cup-shaped piston valve 128 has a bottom wall 158 and a valve stem 160 extending upwardly from the bottom wall 158. The valve stem 160 is slidably received on the guide stem 143 wherein the piston valve 128 is slidably movable within the measuring reservoir 126 between an open position (FIGS. 14 and 16) and a closed position (FIGS. 15 and 17). In the open position (FIGS. 14 and 16), the valve stem 160 is spaced from a valve seat 162 formed at the 138 entrance orifice of the flow conduit 136 whereby flowable product 12 can enter the measuring reservoir 126 through the flow ports 154 and exit through the flow conduit 136 and exit orifice 134. In the closed position (FIGS. 15 and 17), the valve stem 160 is in mating engagement with the valve seat 162 closing the flow conduit 136 and preventing the flowable product 12 from exiting the exit orifice 134.

Optionally, in order to further guide linear movement of the piston valve 128, the second exemplary embodiment 110 includes a cylindrical, axially located guide stem 143 extending upwardly from the bottom wall 146 of the measuring reservoir 126 and the valve stem 160 of the piston valve 128 is formed with an annular shape. In this regard, the annular valve stem 160 may be concentrically received on the guide stem. The guide stem 143 and annular valve stem 160 are not required, and the second exemplary embodiment is also fully functional with the valve structure 28 as illustrated in the first exemplary embodiment.

Figure 13:
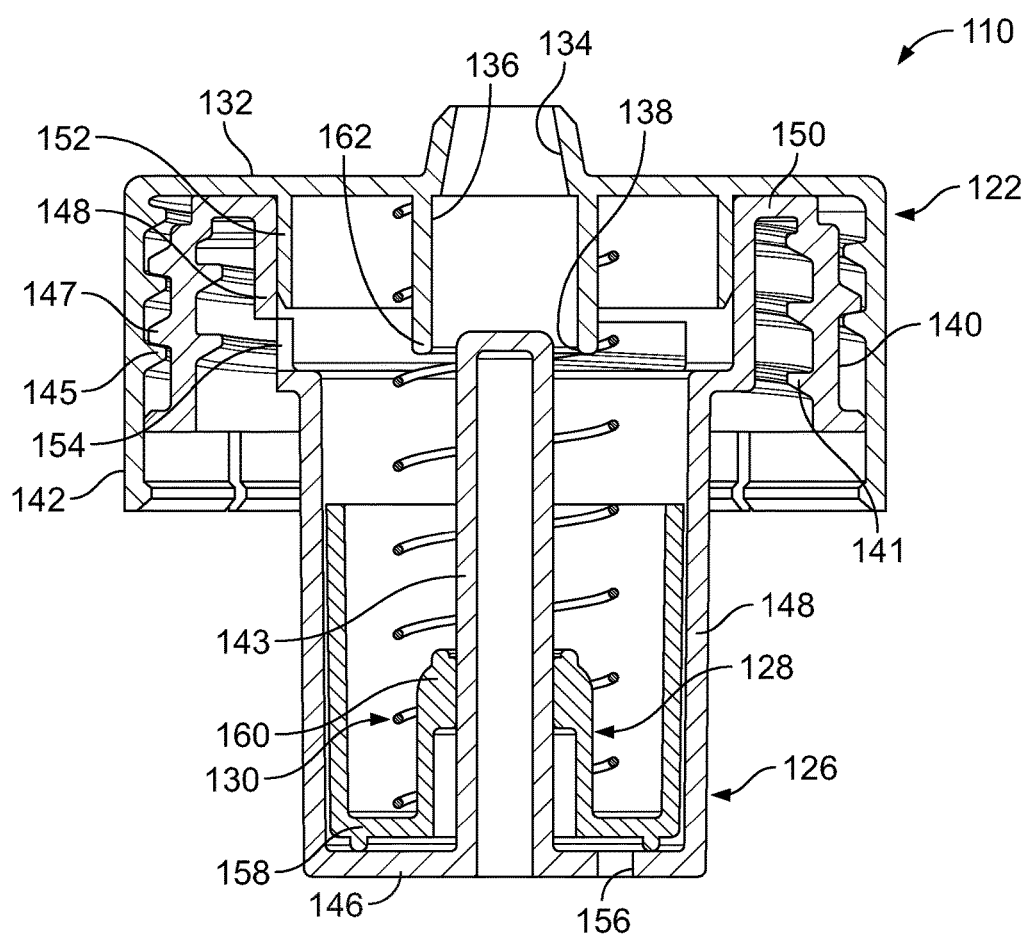
FIG. 13 is a cross-section view thereof taken along line 13-13 of FIG. 12.

The coil spring 130 resides within the measuring reservoir 126 where it encircles the flow conduit 136 and the valve stem 160 and is captured between the lower surface of the upper deck 132 of the dispensing cap 122 and the bottom wall 158 of the piston valve 128. The spring 130 normally biases the piston valve 128 to its open resting position (FIGS. 13, 14 and 16). The piston valve 128 is movable from its normal open position to the closed position (FIGS. 15 and 17) to dispense the measured dose of product 12 responsive to pressure within the container 14 induced by squeezing the container 14.

Dispensing and valve operation is otherwise the same as in the fixed dose embodiment 10.

It can therefore be seen that the exemplary embodiments provide dispensing closures 10 and 110 which are uniquely effective for automatically dispensing a measured dose, or an adjustable measured dose, of flowable product 12 from a squeeze-type container 14.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dispensing closure for dispensing a flowable product from a squeeze-type product container comprising:

a cup-shaped measuring reservoir having a bottom wall, a side wall with an upper peripheral edge, and a plurality of flow ports adjacent said upper peripheral edge, said measuring reservoir having a structure configured to attach to a product container, said measuring reservoir filling with a measured dose of flowable product through said flow ports when inverted;

a dispensing cap having an upper deck, a central exit orifice, a flow conduit in communication with said exit orifice and depending downwardly from said upper deck to provide a flow path from an entrance orifice at a lower end thereof to said exit orifice, and an inner skirt wall depending downward from said upper deck wherein an outer surface of said inner skirt wall is received in sliding engagement with an inner surface of said upper peripheral edge of said side wall of said measuring reservoir whereby said measuring reservoir and said dispensing cap cooperate to define an adjustable reservoir volume, said dispensing cap being movable relative to said measuring reservoir between a minimum volume dispense position and a maximum volume dispense position, a cup-shaped piston valve having a bottom wall and a valve stem extending upwardly from said bottom wall, said piston valve being slidably movable within the measuring reservoir between an open position wherein said valve stem is spaced from a valve seat formed at said entrance orifice of said flow conduit whereby flowable product can enter said measuring reservoir through said flow ports and exit through said flow conduit, and a closed position wherein said valve seat is in mating engagement with said valve seat closing said flow conduit, said piston valve being movable from said open position to said closed position to dispense said measured dose of product responsive to pressure within said container induced by squeezing said container; and a coil spring encircling said flow conduit and said valve stem and captured between said lower surface of said upper deck of said dispensing cap and said bottom wall of said piston valve, said spring normally biasing the piston valve to said open position, said bottom wall of said piston valve further including a plurality of pressure apertures wherein flowable product moves through said pressure apertures when said piston valve is moving between said open and closed positions.

2. The dispensing closure of claim 1 wherein said structure configured to attach said measuring reservoir to said container comprises a reservoir skirt extending outward and downwardly from said upper peripheral edge, said reservoir skirt having an inner surface configured to attach to a neck of said product container.

3. The dispensing closure of claim 2 wherein said inner surface of said reservoir skirt includes an inward thread.

4. The dispensing closure of claim 2 wherein dispensing cap further includes an outer skirt depending downwardly from said upper deck, said outer skirt having an inward thread that engages with an outward thread on said reservoir skirt whereby said dispensing cap is rotatably movable relative to said measuring reservoir to move said dispensing cap between said minimum volume dispense position and said maximum volume dispense position.

5. The dispensing closure of claim 1 wherein said measuring reservoir includes a guide stem extending upwardly from said bottom wall thereof, and said valve stem of said piston valve comprises an annular valve stem received in sliding mated relation with said guide stem.

6. The dispending closure of claim 5 wherein said guide stem is cylindrical.

7. The dispensing closure of claim 4 wherein said measuring reservoir includes a guide stem extending upwardly from said bottom wall thereof, and said valve stem of said piston valve comprises an annular valve stem received in sliding mated relation with said guide stem.

8. The dispending closure of claim 7 wherein said guide stem is cylindrical.

9. A dispensing closure for dispensing a flowable product from a squeeze-type product container comprising:
   a cup-shaped measuring reservoir having a bottom wall, a side wall with an upper peripheral edge, and a plurality of flow ports adjacent said upper peripheral edge;
   a dispensing cap having an upper deck, an exit orifice, a flow conduit in communication with said exit orifice, and an inner skirt wall having an outer surface in sliding engagement with an inner surface of said side wall of said measuring reservoir,
   said dispensing cap being movable relative to said measuring reservoir between a minimum volume dispense position and a maximum volume dispense position,
   a cup-shaped piston valve having a bottom wall and a valve stem extending upwardly from said bottom wall;
   a coil spring encircling said flow conduit and said valve stem and captured between a lower surface of said upper deck of said dispensing cap and said bottom wall of said piston valve, said spring normally biasing the piston valve to an open position; and
   a plurality of pressure apertures in a bottom wall of said piston valve.

10. The dispensing closure of claim 9 further comprising a structure configured to attach said measuring reservoir to said container.

11. The dispensing closure of claim 10 wherein said structure comprises a reservoir skirt extending outward and downwardly from said upper peripheral edge, said reservoir skirt having an inner surface configured to attach to a neck of said product container.

12. The dispensing closure of claim 11 wherein said inner surface of said reservoir skirt includes an inward thread.

13. The dispensing closure of claim 11 wherein dispensing cap further includes an outer skirt depending downwardly from said upper deck, said outer skirt having an inward thread that engages with an outward thread on said reservoir skirt whereby said dispensing cap is rotatably movable relative to said measuring reservoir to move said dispensing cap between said minimum volume dispense position and said maximum volume dispense position.

14. The dispensing closure of claim 9 wherein said measuring reservoir includes a guide stem extending upwardly from said bottom wall thereof, and said valve stem of said piston valve comprises an annular valve stem received in sliding mated relation with said guide stem.

15. The dispending closure of claim 14 wherein said guide stem is cylindrical.

16. The dispensing closure of claim 13 wherein said measuring reservoir includes a guide stem extending upwardly from said bottom wall thereof, and said valve stem of said piston valve comprises an annular valve stem received in sliding mated relation with said guide stem.

17. The dispending closure of claim 16 wherein said guide stem is cylindrical.

\* \* \* \* \*